United States Patent
Suzuki et al.

(10) Patent No.: US 8,514,240 B2
(45) Date of Patent: Aug. 20, 2013

(54) AUTHENTICATION SYSTEM, AUTHENTICATION PROGRAM, AND METHOD OF AUTHENTICATION

(75) Inventors: Naoko Suzuki, Inagi (JP); Junichiro Toya, Inagi (JP); Shinya Iwasaki, Inagi (JP); Yasuhiko Mita, Inagi (JP); Kiyomi Ozawa, Inagi (JP)

(73) Assignee: Fujitsu Frontech Limited, Inagi-shi, Tokyo (JP)

( * ) Notice: Subject to any disclaimer, the term of this patent is extended or adjusted under 35 U.S.C. 154(b) by 0 days.

(21) Appl. No.: 13/568,686

(22) Filed: Aug. 7, 2012

(65) Prior Publication Data
US 2012/0299949 A1    Nov. 29, 2012

Related U.S. Application Data

(63) Continuation of application No. PCT/JP2010/052882, filed on Feb. 24, 2010.

(51) Int. Cl.
*G09G 5/02* (2006.01)
(52) U.S. Cl.
USPC ........... 345/591; 345/589; 345/593; 382/115; 382/124; 382/125; 382/190
(58) Field of Classification Search
USPC ................. 345/589, 591, 593; 382/115, 124, 382/125, 190
See application file for complete search history.

(56) References Cited

U.S. PATENT DOCUMENTS

| 6,310,627 B1 | 10/2001 | Sakaguchi |
| 2006/0232583 A1* | 10/2006 | Petrov et al. .................. 345/419 |
| 2007/0207451 A1* | 9/2007 | Perner ............................. 435/4 |
| 2008/0226136 A1 | 9/2008 | Takaku et al. |
| 2008/0247649 A1* | 10/2008 | Cheng ........................... 382/190 |
| 2011/0091099 A1* | 4/2011 | Akiyama ........................ 382/162 |

FOREIGN PATENT DOCUMENTS

| CA | 2259788 A1 | 7/1999 |
| EP | 0933728 A2 | 8/1999 |
| EP | 1903509 A1 | 3/2008 |
| JP | 11-203347 A | 7/1999 |
| JP | 2001-216497 A | 8/2001 |
| JP | 2004-105604 A | 4/2004 |
| JP | 2006-042880 A | 2/2006 |
| JP | 2008-071158 A | 3/2008 |
| JP | 2009-005273 A | 1/2009 |

OTHER PUBLICATIONS

International Search Report of PCT/JP2010/052882, mailing date of May 11, 2010.

* cited by examiner

*Primary Examiner* — Xiao M. Wu
*Assistant Examiner* — Todd Buttram
(74) *Attorney, Agent, or Firm* — Westman, Hattori, Daniels & Adrian, LLP

(57) ABSTRACT

A processing unit executes a process for creating a dedicated color palette (color palette dedicated for a palm vein GUI) as an initialization process, and creates the color palette dedicated for a palm vein GUI. The processing unit replaces a 256-level gradation grayscale palette set in an acquired photographed image with the color palette dedicated for the palm vein GUI. The processing unit performs guide GUI display for guiding a palm to an appropriate position, using a display image formed by setting the color palette dedicated for the palm vein GUI for the photographed image acquired from a photographed image-acquiring process.

7 Claims, 15 Drawing Sheets

300 DATA STRUCTURE OF 8-bit (256-color) UNCOMPRESSED DIB

| BITMAP INFORMATION HEADER | NUMBER OF HORIZONTAL PIXELS OF IMAGE<br>NUMBER OF VERTICAL PIXELS OF IMAGE<br>NUMBER OF PLANES = 1<br>NUMBER OF BITS PER PIXEL = 8<br>COMPRESSION METHOD = 0<br>SIZE OF WHOLE IMAGE DATA |
|---|---|
| COLOR PALETTE | ARRAY OF 256-color DATA (RGB VALUE)<br><br>0 \| B \| G \| R \| —<br>1 \| B \| G \| R \| —<br>... ...<br>255 \| B \| G \| R \| —<br><br>0~255    RESERVED |
| PIXEL DATA | COLOR INFORMATION ON PIXEL BASIS (ARRAY ELEMENT INDEX NUMBER OF COLOR PALETTE)<br><br>N \| N \| N \| N \| ...<br>... N \| N \| N \| ... |

FIG. 7

*301 SOURCE IMAGE DIB

| | |
|---|---|
| BITMAP INFORMATION HEADER | NUMBER OF HORIZONTAL PIXELS OF IMAGE<br>NUMBER OF VERTICAL PIXELS OF IMAGE<br>NUMBER OF PLANES = 1<br>NUMBER OF BITS PER PIXEL = 8<br>COMPRESSION METHOD = 0<br>SIZE OF WHOLE IMAGE DATA |
| COLOR PALETTE | 256-level gradation grayscale palette<br><br>⊢―――――――――――――――――――⊣<br>0                                           255<br>←――――――――――――――――――→<br>DARK                                    LIGHT |
| PIXEL DATA | COLOR INFORMATION ON PIXEL BASIS (ARRAY ELEMENT INDEX NUMBER OF COLOR PALETTE)<br><br>N N N N ···<br><br>··· N N N ··· |

FIG. 9

302 DISPLAY IMAGE DIB

| BITMAP INFORMATION HEADER | NUMBER OF HORIZONTAL PIXELS OF IMAGE<br>NUMBER OF VERTICAL PIXELS OF IMAGE<br>NUMBER OF PLANES = 1<br>NUMBER OF BITS PER PIXEL = 8<br>COMPRESSION METHOD = 0<br>SIZE OF WHOLE IMAGE DATA |
|---|---|
| COLOR PALETTE | COLOR PALETTE DEDICATED FOR PALM VEIN GUI<br><br>0   35                               255<br>BACK-GROUND   LIGHT               DARK |
| PIXEL DATA | COLOR INFORMATION ON PIXEL BASIS (ARRAY ELEMENT INDEX NUMBER OF COLOR PALETTE)<br><br>N N N N ...<br>... N N N ... |

"Please Place your hand parallel to the sensor."

"Please slightly draw back your hand."

AUTHENTICATION SYSTEM, AUTHENTICATION PROGRAM, AND METHOD OF AUTHENTICATION

CROSS-REFERENCE TO RELATED APPLICATION

This application is a continuation application of International Application PCT/JP2010/052882 filed on Feb. 24, 2010 and designated the U.S., the entire contents of which are incorporated herein by reference.

FIELD

The present invention relates to an authentication system, an authentication program, and an authentication method, for authenticating an individual by making use of biometric features.

BACKGROUND

A human body includes biometric information items which make it possible to identify an individual, and some of the biometric information items are used as information for identifying and authenticating the individual. For example, it is known that the biometric information items which are considered to be capable of being used for authentication include fingerprints, eye retinas and irises, a face, veins, DNA (deoxyribonucleic acid), and so forth.

In recent years, with the development of a biometric authentication technique, there have been provided various types of apparatuses for authenticating an individual by recognizing biometric features of part of a human body. In this biometric authentication, the authentication of an individual is performed by comparing biometric information acquired during registration thereof and biometric information acquired during authentication.

To improve the accuracy of individual authentication using such biometric information, it is desirable to acquire accurate biometric information, and therefore the authentication apparatuses acquire biometric information under sensing conditions made identical. To this end, there has been proposed an authentication apparatus that announces the user (person to be authenticated) that a portion for biometric feature detection of a living body is required to have an appropriate positional relationship with a sensor, to thereby guide the portion for biometric feature detection to a position ensuring the appropriate positional relationship with the sensor (see e.g. Japanese Laid-Open Patent Publication No. 2006-42880).

Further, to provide an efficient guide to conditions under which an image is picked up for registration, there has been proposed an authentication apparatus that displays a photographed image in a manner superimposed on the silhouette of a registered hand (see e.g. Japanese Laid-Open Patent Publication No. 2008-71158).

For example, the authentication apparatus that guides the portion for biometric feature detection to a position having an appropriate positional relationship with the sensor performs a conventional authentication control process, as illustrated in FIG. 15.

The authentication control process 90 acquires an image from the sensor 95, and outputs a result of verification to a user application 97. The authentication control process 90 acquires the image from the sensor 95 by an image acquiring process 91, and passes the acquired image to a position and posture determination process 92. The position and posture determination process 92 determines the position and the posture of a portion for biometric feature detection, and passes a result of determination together with the acquired image to a guide GUI (graphical user interface) display process 93. If the position and posture determination process 92 determines that the position and the posture of the portion for biometric feature detection is not appropriate, the position and posture determination process 92 requests the image acquiring process 91 to acquire an image. The guide GUI display process 93 displays a guide GUI display image 96 on a monitor or the like, to thereby guide the living body portion for biometric feature detection to a position having an appropriate positional relationship with the sensor 95. Further, the position and posture determination process 92 requests a verification process 94 to perform verification, and passes the acquired image to the verification process 94. The verification process 94 verifies the acquired image against an image or a feature of the living body, registered in advance, and outputs a result of the verification.

Further, there has been proposed a technique for assisting in photographing by inversion of the luminance of contour information or display on the monitor by gradation correction (see e.g. Japanese Laid-Open Patent Publication No. 2009-5273).

However, a photographed image displayed for guiding the portion for biometric feature detection to a position having an appropriate positional relationship with the sensor sometimes does not have sufficient visibility for user's recognition, and therefore the photographed image sometimes does not properly function as a guide silhouette unless further processing is executed thereon. Further, when the photographed image is subjected to special processing, for display, the display of the image is delayed from an actual movement, which sometimes hinders the photographed image from properly functioning as a guide silhouette.

Further, when a photographed image including biometric information is displayed, a privacy or security problem sometimes occurs, and hence such a photographed image is sometimes inappropriate as a display image depending on an environment where authentication is performed.

SUMMARY

According to an aspect, there is provided a computer-readable medium storing a computer program for authenticating an individual by using a biometric feature of a living body. The computer program causing a computer to perform a procedure includes: generating, from an photographed image of the living body, photographed image data including a monochromatic palette formed by arranging indexed colors to which monochromatic colors are assigned in order of density; generating display data by replacing the monochromatic palette included in the photographed image data with a color palette in which one of arrangements formed by dividing the arrangement of the indexed colors by a predetermined background boundary threshold value is set as a background display arrangement of indexed colors to which a background color is assigned, and the other of the arrangements is set as a living body display arrangement of indexed colors to which a specific color is assigned in order of density; and displaying the living body using the display data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates the data structure of 8-bit (256-color) uncompressed DIB according to the embodiment;

FIG. 7 illustrates an example of the data structure of a source image DIB according to the embodiment;

FIG. 9 illustrates an example of the data structure of a display image DIB according to the embodiment;

DESCRIPTION OF EMBODIMENTS

Embodiments of the present invention will be explained below with reference to the accompanying drawings.

Figure 1:
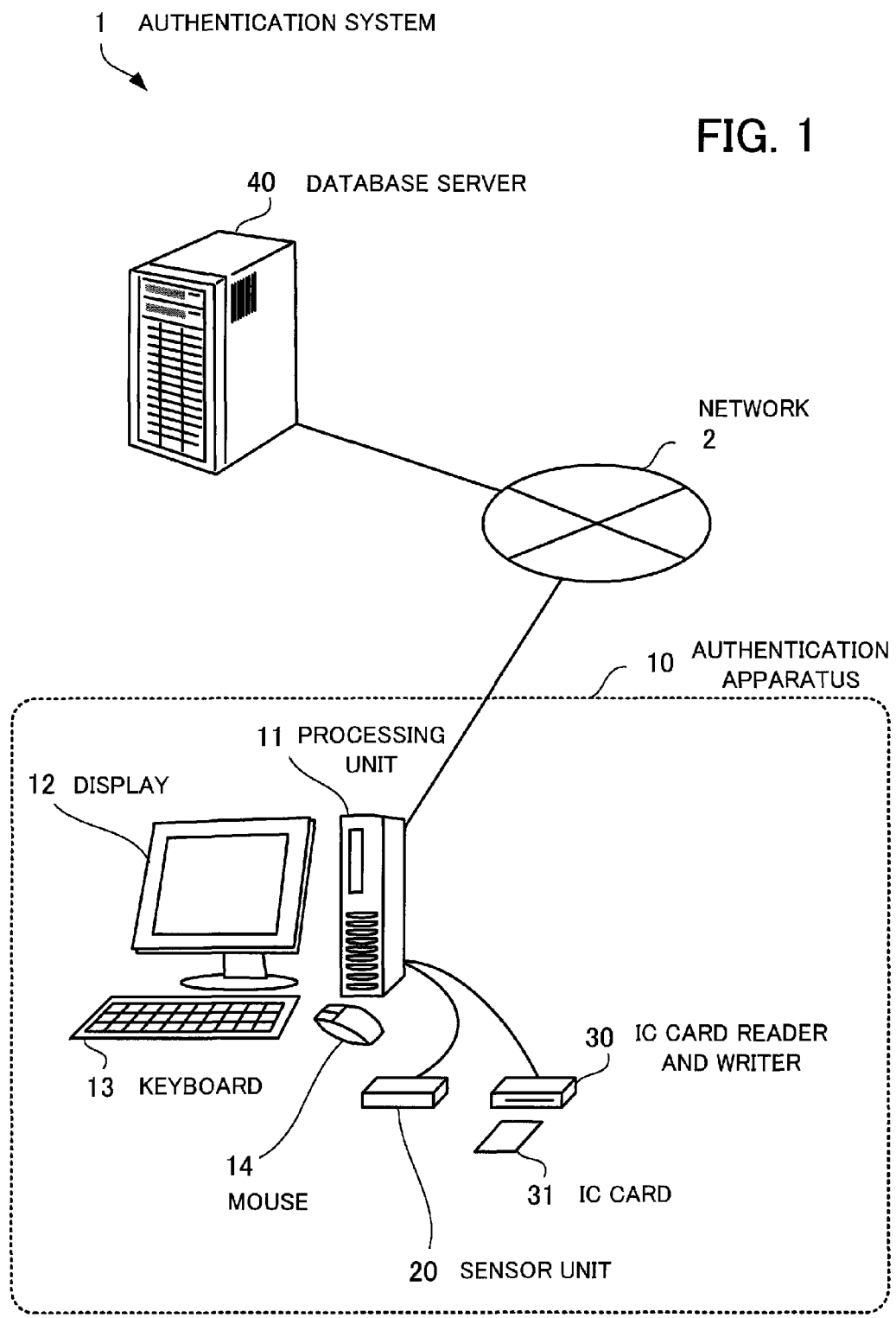
FIG. 1 illustrates an authentication system according to an embodiment.

FIG. 1 illustrates an authentication system according to an embodiment. Although in the present embodiment, an authentication system 1 is illustrated as an authentication system that performs authentication of an individual, using veins of a palm, by way of example, this is not limitative, but it is applicable to a system which performs the authentication using another portion of a living body for biometric feature detection.

The authentication system 1 is one which identifies and authenticates an individual by recognizing a biometric feature, and can be used for logging on to an information system or controlling the entrance and exit to and from a room. The authentication system 1 includes an authentication apparatus 10 and a database server 40 connected to the authentication apparatus 10 via a network 2.

The database server 40 stores identification information for identifying individuals and biometric information registered in advance for biometric authentication in a manner associated with each other. The identification information for identifying an individual is unique ID (identification) information given to a user directly (e.g. an employee number) or indirectly (e.g. a bank account number). The biometric information registered in advance includes feature information acquired by extracting a feature portion from image information, and encoded information acquired by encoding the image information or the feature information.

The authentication apparatus 10 comprises a processing device 11, a display 12, and a sensor unit 20. The authentication apparatus 10 further comprises a keyboard 13, a mouse 14, an IC (integrated circuit) card reader/writer 30, and so forth, as required. The sensor unit 20, which includes an image pickup device, photographs an image of a palm of the user, and outputs the photographed image to the processing device 11. The IC card reader and writer 30 reads and writes information of an IC card 31 of the user. The keyboard 13 and the mouse 14 receive user input operations.

Now, a description will be given of palm vein authentication. A user requesting authentication inputs identification information (e.g. user ID) for identifying the user using the keyboard 13 and the mouse 14 or the IC card reader and writer 30. The authentication apparatus 10 requests, via the display 12, the user to input biometric information for authenticating the user. The user holds a hand over the sensor unit 20 to thereby input the biometric information. The authentication apparatus 10 having an image of the palm input therein as the biometric information verifies the image of the palm against biometric information stored in advance in a storage section of the database server 40 or the IC card 31 of the user.

Figure 2:
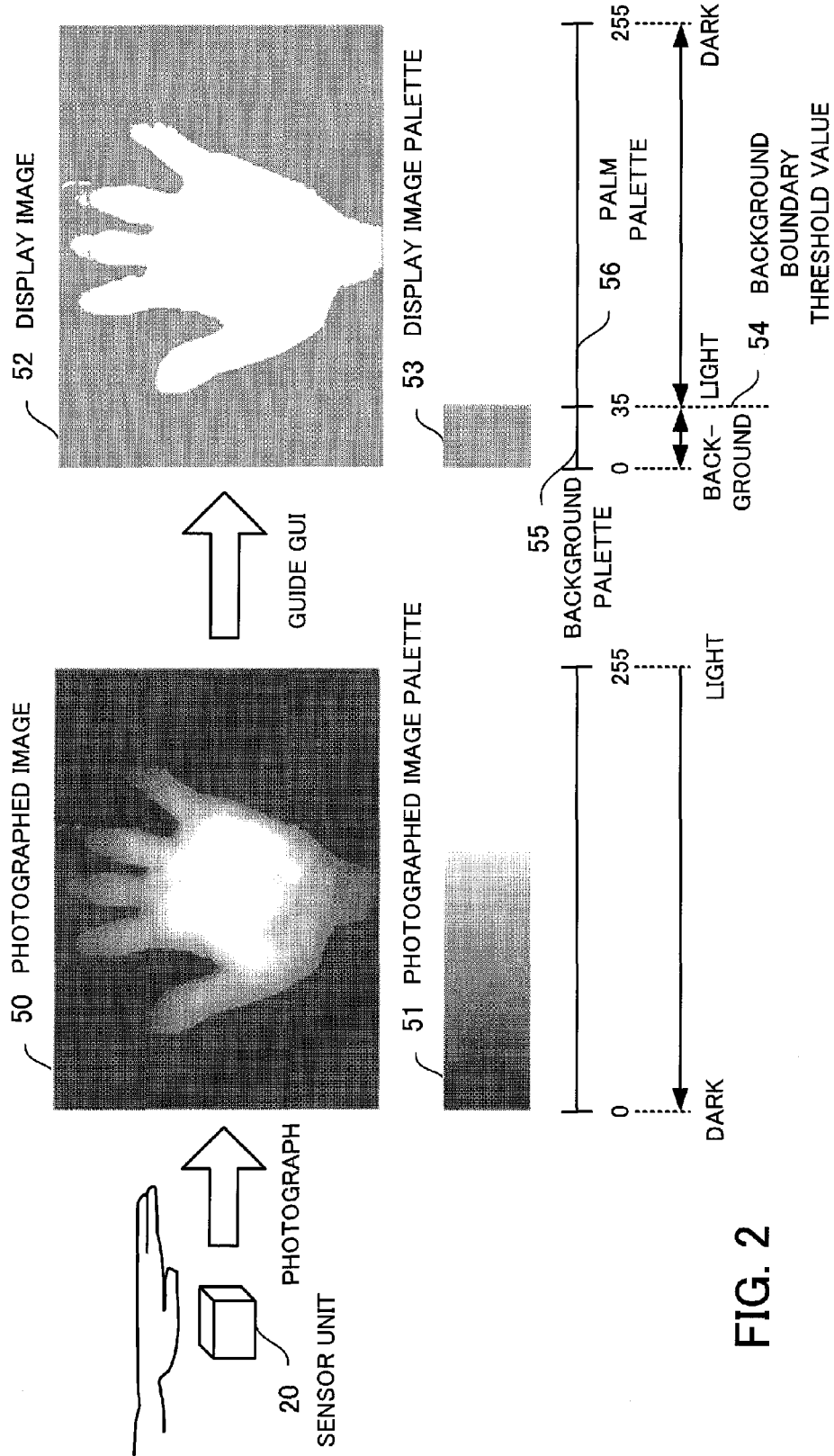
FIG. 2 illustrates conversion of a photographed image to a display image, performed by an authentication apparatus according to the embodiment.
Figure 3A:
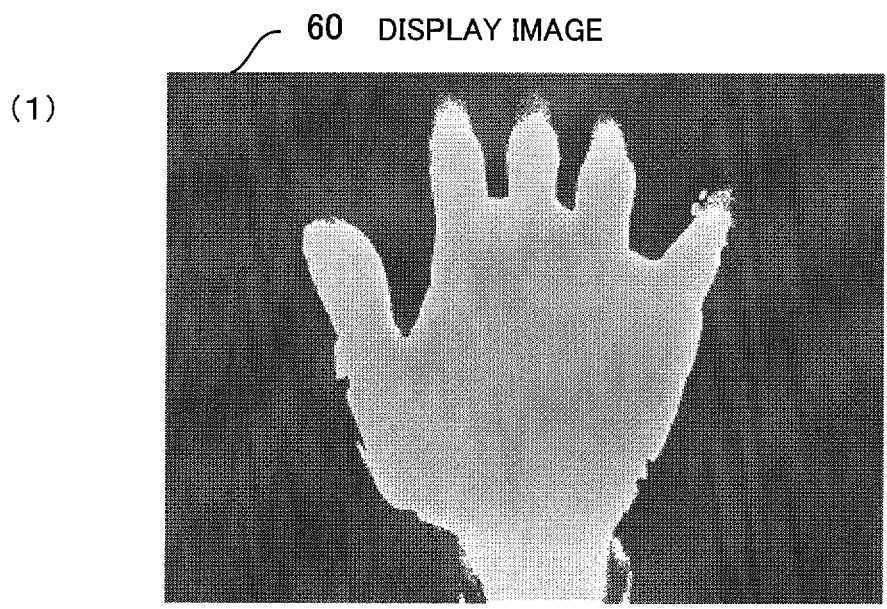
FIGS. 3A and 3B illustrate examples of the display image according to the embodiment.
Figure 3B:
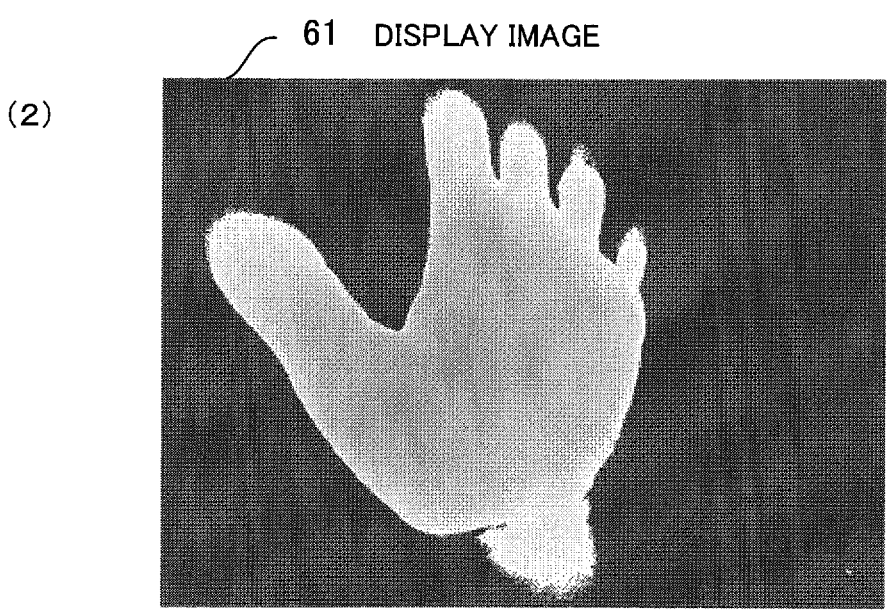

Next, the conversion of a photographed image to a display image will be described with reference to FIGS. 2 and 3. FIG. 2 illustrates the conversion of a photographed image to a display image, which is performed by the authentication apparatus according to the present embodiment. FIGS. 3A and 3B illustrate examples of the display image according to the present embodiment.

The photographed image 50 is acquired by the user by holding a palm over the sensor unit 20. The photographed image 50 is an image acquired by irradiating near infrared rays onto the palm and photographing reflected light from the palm. Since hemoglobin in red cells flowing through veins of the palm has lost oxygen, the hemoglobin (reduced hemoglobin) has the property of absorbing near infrared rays in the vicinity of 760 nm. Therefore, when near infrared rays are irradiated onto the palm, there is little reflection of the near infrared rays only from a portion where the veins extend, whereby it is possible to recognize positions of the veins by the degree of the intensity of the reflected light of the near infrared rays. Although the photographed image 50 is made easy to extract characteristic information by using a specific light source, it becomes an achromatic image.

Further, when the photographed image 50 is handled as data, if colors are designated on a pixel-by-pixel basis, the amount of information becomes too large. To cope with this inconvenience, a table (color palette) defining usable colors is prepared, and an indexed color (reference information for referring to the color palette) is designated for each pixel, whereby the amount of information is reduced.

Since the photographed image 50 is grayscale data represented by (8-bit) pixel values (0-255), it is possible to use a grayscale color palette (grayscale palette) of 256 levels. A photographed image palette 51 is a grayscale palette of 256 levels formed by arranging colors between white as a light color and black as a dark color in the order of density. If displayed e.g. on a display, the photographed image palette 51 has a sufficient monochromatic resolution, thereby making it possible to represent the photographed image 50.

Conventionally, the photographed image 50 has been used in a palm vein system as a silhouette image for guiding a position of the palm, but even if the photographed image 50 is displayed after being smoothed by image processing, the image of veins is conspicuous, which has caused not a small number of users to have an unpleasant feeling of "grotesque and scary". Further, also from the viewpoint of privacy or security, it is not desirable to display the vein image as it is. Furthermore, when the hand is distant from the sensor unit 20, the photographed image 50 sometimes ceases to sufficiently function as a silhouette image since the hand is darkened to degrade the visibility of the contour of the hand.

To solve the above problem, the authentication apparatus 10 does not use the photographed image 50 as it is, as a silhouette image, but uses the same as a silhouette image after converting the photographed image 50 to a display image 52 by a guide GUI. At this time, if advanced image conversion is performed, a time lag occurs between the movement of the hand and display of the silhouette image, and hence it is required to prevent the load of processing for converting the photographed image 50 to the display image 52 from becoming too large.

To meet this requirement, the authentication apparatus 10 displays the display image 52 by replacing the photographed image palette 51 used for displaying the photographed image 50 with a display image palette 53. The display image palette 53 comprises a background palette 55 and a palm palette 56. The background palette 55 and the palm palette 56 are not independent color palettes but are parts of the display image palette 53.

The background palette 55 ranges from an indexed color [0] of the background palette 53 to an indexed color [35], which is a background boundary threshold value 54. The background palette 55 is a color palette formed by assigning monochromatic background colors to all the indexed colors from [0] to [35].

The palm palette 56 ranges from an indexed color [36], which is next to the background boundary threshold value 54, to an indexed color [255] of the display image palette 53. The palm palette 56 is a color palette of 220 levels formed by arranging specific colors (e.g. of light orange color) from a light color to a dark color.

Further, while the photographed image palette 51 is formed by arranging indexed colors from a dark color to a light color in the order of density, the palm palette 56 is formed by arranging indexed colors from a light color to a dark color in a direction opposite to the direction of arrangement of the indexed colors in the photographed image palette 51. As a consequence, the vein image displayed in dark colors in the photographed image 50 is displayed in light colors in the display image 52, thereby making it difficult to visually recognize the vein image.

Further, the palm palette 56 is set such that the range of density of the colors used therein is smaller than that of density of the colors used in the photographed image palette 51. As a consequence, the vein image has reduced differences in density from the portions of the palm, which makes it more difficult to visually recognize the vein image.

Therefore, the display image 52 as a silhouette image reduces the unpleasant feeling that the user has had when viewing the display image 52. Further, when used a silhouette image, the display image 52 makes it difficult for a third person to visually recognize the vein image, and therefore the display image 52 also reduces the possibility of occurrence of the problem of privacy or security.

Further, the background color that the background palette 55 assign to all the indexed colors can be set to be the complementary color of a boundary color of the photographed image palette 51 (color assigned to the indexed color [36]). In this case, the background color emphasizes the contour of the palm.

Further, the palm palette 56 has the indexed colors arranged in the order of density though opposite in the direction of arrangement of the indexed colors to the photographed image palette 51, and hence it is possible to express variation in density of the hand represented by the grayscale, which makes it possible to favorably grasp e.g. how the hand is inclined.

As described above, by replacing the photographed image palette 51 of image data desired to be displayed, with the display image palette 53, it is possible to display an image, such as a display image 60 or a display image 61. The display images 60 and 61 are clear in the contrast between the palm and the background, thereby making it possible to easily grasp the contour of the palm. Further, the display images 60 and 61 make it difficult to visually identify the vein image, and hence reduce the unpleasant feeling that the user has had when viewing the display images 60 and 61, and the possibility of occurrence of the problem of privacy or security. Further, the display images 60 and 61 sufficiently represent differences in density between the colors, caused by the inclination of the palm, thereby making it possible to favorably grasp how the hand is inclined and sense the distance between the hand and the sensor unit 20.

Figure 4:
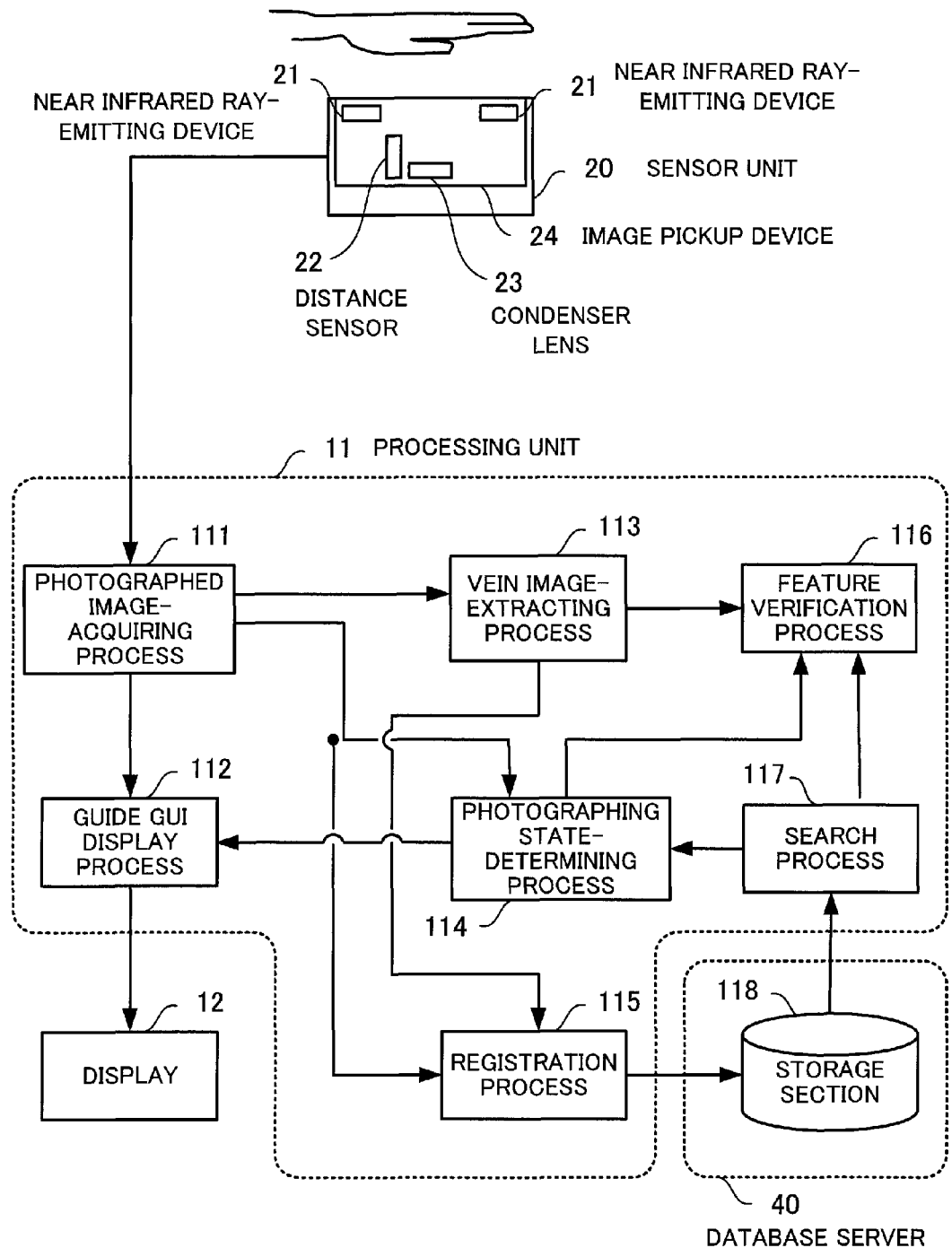
FIG. 4 is a block diagram of the authentication system according to the embodiment.

Next, the arrangement of the sensor unit 20 and processes executed by the authentication system will be described with reference to FIG. 4. FIG. 4 is a block diagram of the authentication system according to the present embodiment.

The sensor unit 20 has an image pickup device 24 mounted thereon. The image pickup device 24 includes an infrared ray sensor (e.g. CMOS (complementary metal oxide semiconductor) sensor), not shown, a condenser lens 23, and a distance sensor 22, which are provided in a central portion thereof, and is equipped with a plurality of near infrared ray-emitting devices (LEDs) 21 oriented in an imaging direction. The near infrared ray-emitting devices 21 are provided e.g. in eight peripheral portions of the infrared ray sensor, for emitting near infrared rays upward (in the imaging direction).

The sensor unit 20 delivers a photographed image and measured distance information measured by the distance sensor 22 to the processing device 11. The processing device 11 executes a photographed image-acquiring process 111, a guide GUI display process 112, a vein image-extracting process 113, a photographing state-determining process 114, a registration process 115, a feature verification process 116, and a search process 117.

The photographed image-acquiring process 111 acquires the measured distance information and the photographed image from the sensor unit 20, and notifies the photographing state-determining process 114, the guide GUI display process 112, the vein image-extracting process 113, and the registration process 115 of the acquired measured distance information and photographed image.

The guide GUI display process 112 displays a guide GUI for guiding a palm of a user to an appropriate position on the display 12. When displaying the guide GUI on the display 12, the guide GUI display process 112 changes the color palette for use in displaying the photographed image from the photographed image palette 51 to the display image palette 53, as described above. Note that the guide GUI display process 112 acquires information indicative of whether or not the position of the palm is appropriate, from an imaging state-determining process 114, described hereinafter.

The vein image-extracting process 113 extracts a vein image (biometric feature data) of veins from the photographed image, and notifies the vein image to the registration process 115.

The registration process 115 operates, when registering a user, to register a photographed image, photographing conditions, biometric feature data, and so forth, in a storage section 118 of the database server 40. Note that the storage section 118 may be provided in the IC card 31.

The search process 117 uses a user ID input at the time of verification, to search the storage section 118 for a photographed image, photographing conditions, and biometric feature data associated with the user ID. The imaging state-determining process 114 determines whether or not an imaging state is appropriate, by comparing the photographed image and photographing conditions acquired from the storage section 118 by the search process 117 and the photographed image and photographing conditions input from the sensor unit 20.

The imaging state-determining process 114 determines whether or not the palm is positioned at an appropriate distance from the sensor unit 20, and whether or not the contour (position and posture) of the palm detected from the photographed image is in an appropriate position, compared with standard conditions or the photographing conditions input during the user registration. If it is determined that the photographed image and the photographing conditions input at the time of authentication are appropriate, the imaging state-determining process 114 notifies the feature verification process 116 that feature verification can be performed. Further, the imaging state-determining process 114 notifies the guide GUI display process 112 of evaluations of the photographed image and the photographing conditions input at the time of authentication.

The feature verification process 116 determines the degree of coincidence (degree of similarity) between the biometric feature data acquired from the storage section 118 by the search process 117 and the biometric feature data (vein image data) extracted by the vein image-extracting process 113, and notifies a user application of whether or not the user is authenticated, as a result of the verification.

Figure 5:
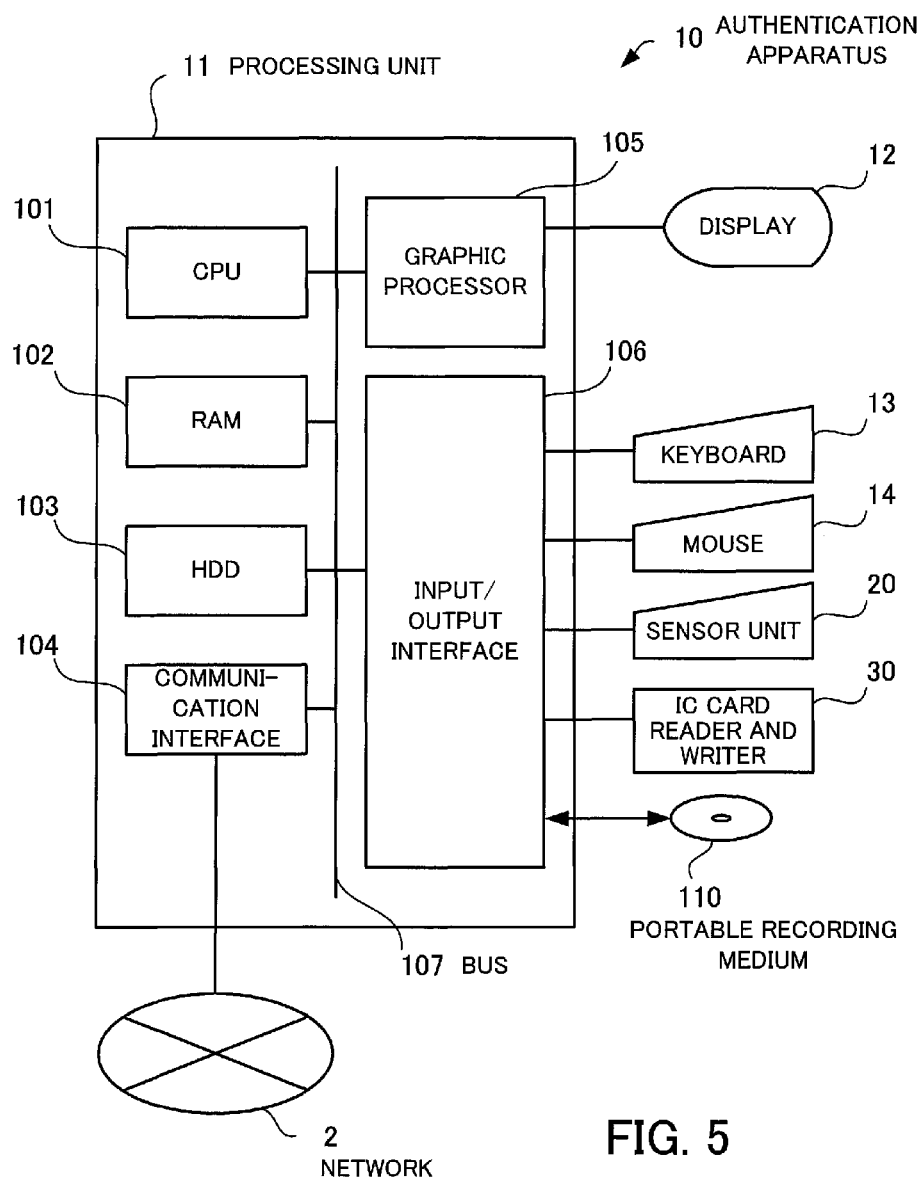
FIG. 5 illustrates an example of the hardware configuration of the authentication apparatus according to the embodiment.

Next, an example of the hardware configuration of the authentication apparatus according to the present embodiment will be described with reference to FIG. 5. FIG. 5 illustrates the hardware configuration of the authentication apparatus according to the present embodiment.

The authentication apparatus 10 comprises the processing device 11, the display 12, the keyboard 13, the mouse 14, the sensor unit 20, and the IC card reader and writer 30.

The overall operation of the processing device 11 is controlled by a CPU (Central Processing Unit) 101. A RAM (Random Access Memory) 102, an HDD (Hard Disk Drive) 103, a communication interface 104, a graphic processor 105, and an input/output interface 106 are connected to the CPU 101 via a bus 107.

The RAM 102 temporarily stores at least part of the program of an OS (operating system) and application programs which the CPU 101 is caused to execute. Further, the RAM 102 stores various data required by the CPU 101 for processing. The HDD 103 stores the OS and the application programs.

The display 12 is connected to the graphic processor 105. The graphic processor 105 displays images on the screen of the display 12 according to commands from the CPU 101.

To the input/output interface 106 are connected the keyboard 13, the mouse 14, the sensor unit 20, and the IC card reader and writer 30. Further, the input/output interface 106 is configured to be connectable to a portable recording medium interface which is capable of writing information into a portable recording medium 110, and reading out information from the portable recording medium 110. The input/output interface 106 transmits signals sent from the keyboard 13, the mouse 14, the sensor unit 20, the IC card reader and writer 30, and the portable recording medium interface, to the CPU 101 via the bus 107.

The communication interface 104 is connected to the network 2. The communication interface 104 transmits and receives data to and from the database server 40.

With the above-described hardware configuration, it is possible to realize the processing functions according to the present embodiment. Note that database server 40 as well can be realized by the same hardware configuration.

Note that each processing device 11 can also be configured to include a module formed by an FPGA (Field Programmable Gate Array), a DSP (Digital Signal Processor), and so forth, and can also be configured without the CPU 101. In this case, each processing device 11 is equipped with a nonvolatile memory (an EEPROM (Electrically Erasable and Programmable Read Only Memory), a flash memory, or a flash memory semiconductor device, for example), and stores a firmware of the module. The firmware can be written in the nonvolatile memory via the portable recording medium 110 or the communication interface 104. Thus, the processing device 11 can also update the firmware by rewriting the firmware stored in the nonvolatile memory.

Next, the data structure of photographed image data will be described with reference to FIG. 6. FIG. 6 illustrates the data structure of 8-bit (256-color) uncompressed DIB according to the present embodiment.

The photographed image data has a data structure 300 of the 8-bit (256-color) uncompressed DIB (Device-Independent Bitmap). The data structure 300 of the 8-bit (256-color) uncompressed DIB is formed by a bitmap information header, a color palette, and pixel data.

The bitmap information header includes information of the number of horizontal pixels of an image, the number of vertical pixels of the image, the number of planes, the number of bits per pixel, a compression method, the size of whole image data.

For example, in a case where 256-colors are designated, the color palette has an array structure from the indexed color [0] to the indexed color [255]. Each array has array elements "B", "G", "R", and "-" as data. Each array element "B" stores data representing a B (blue) luminance of a pixel in one of 256 levels of gradation by 1 byte of data. Each array element "G" stores data representing a G (green) luminance of a pixel in one of 256 levels of gradation by 1 byte of data. Each array element "R" stores data representing an R (red) luminance of a pixel in one of 256 levels of gradation by 1 byte of data. The array element "-" stores "0" by 1 byte of reservation data.

The pixel data stores the array element index numbers of indexed colors (color information) of all the pixels on a pixel-by-pixel basis.

Figure 8:
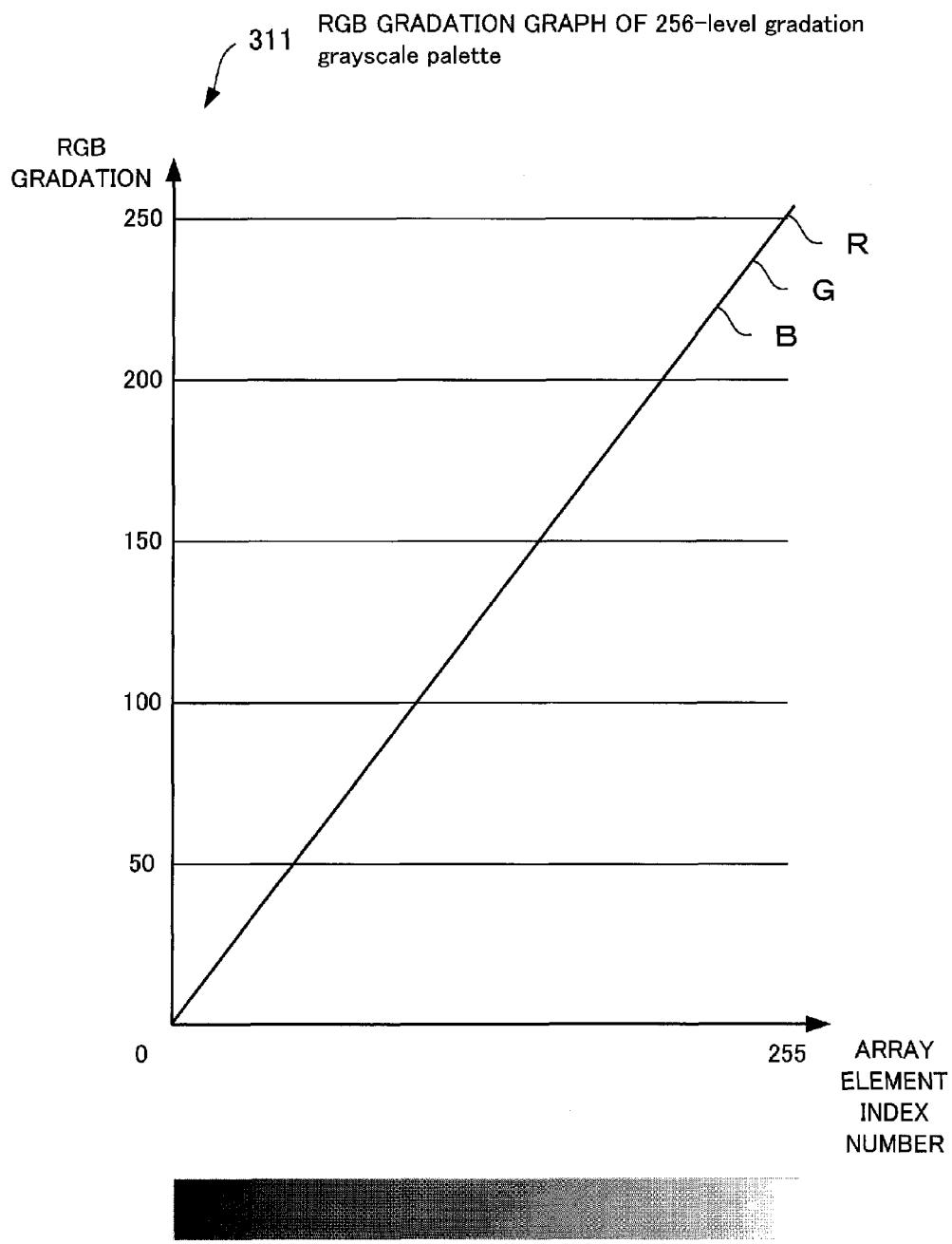
FIG. 8 illustrates an example of an RGB gradation graph of a 256-level gradation grayscale palette according to the embodiment.

Next, the data structure of a source image DIB will be described with reference to FIGS. 7 and 8. FIG. 7 illustrates an example of the data structure of the source image DIB according to the present embodiment. FIG. 8 illustrates an example of an RGB gradation graph of the 256-level gradation grayscale palette according to the present embodiment.

The photographed image data has the data structure 300 of the 8-bit (256-color) uncompressed DIB. More specifically, the photographed image data has a data structure as illustrated by a source image DIB 301. The source image DIB 301 has the 256-level gradation grayscale palette.

The 256-level gradation grayscale palette is a grayscale color palette in which the indexed colors from the indexed color [0] for designating the dark color of black to the indexed color [255] for designating the light color of white are arranged in 256 levels in the order of density.

Assuming that n is an integer from 0 to 255, to represent the grayscale, the 256-level gradation grayscale palette can be represented by an indexed color [n]=(n, n, n, 0). Here, the elements within the parenthesis represent the above-mentioned B luminance, G luminance, R luminance, and reserved data 0 in the mentioned order. Specifically, the 256-level gradation grayscale palette is represented by the indexed color [0]=(0, 0, 0, 0), the indexed color [1]=(1, 1, 1, 0), . . . , the indexed color [255]=(255, 255, 255, 0), as illustrated by an RGB gradation graph 311 of the 256-level gradation grayscale palette.

The pixel data stores the array element index numbers of the indexed colors of all the pixels on a pixel-by-pixel basis according to the photographed image.

Figure 10:
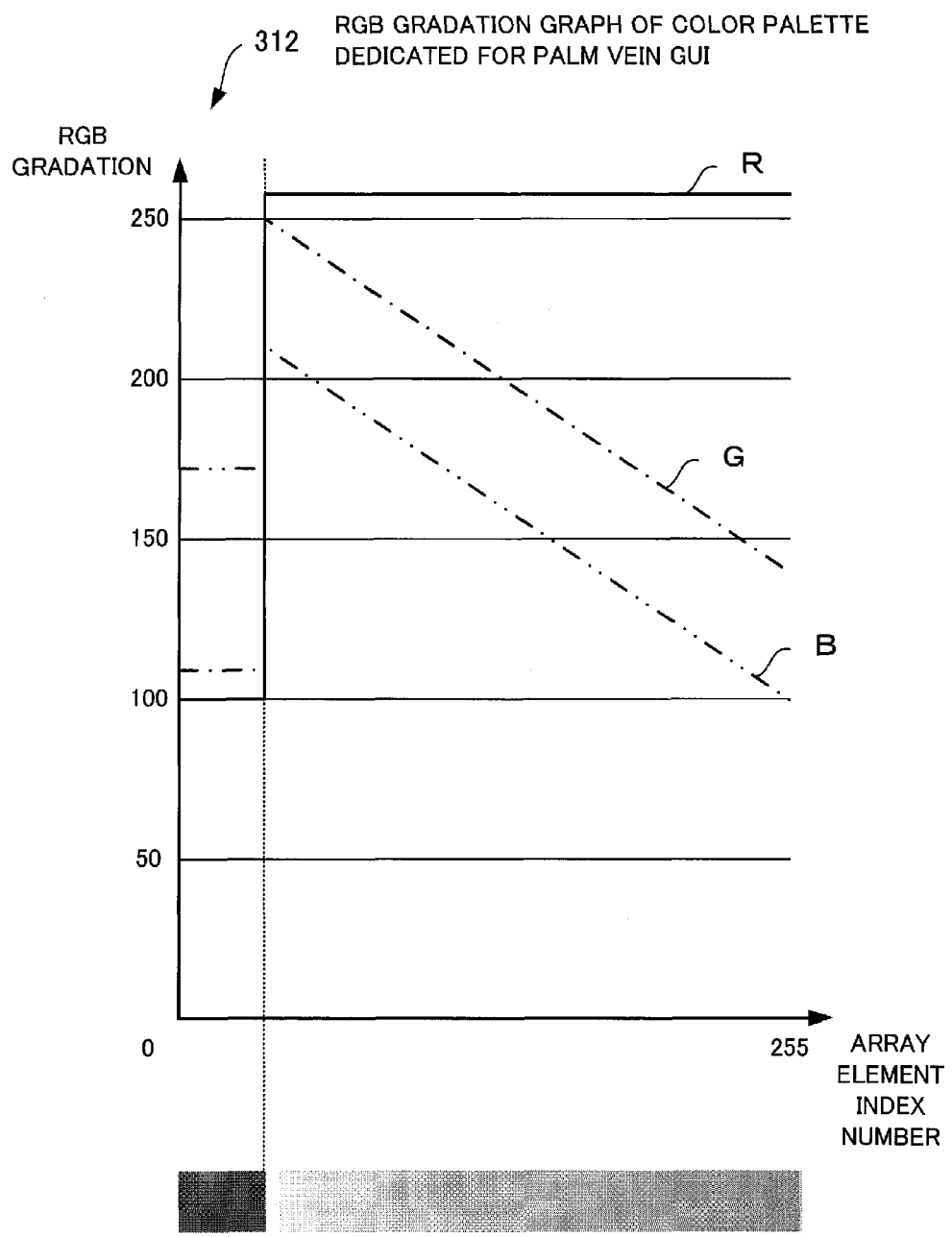
FIG. 10 illustrates an example of an RGB gradation graph of a color palette dedicated for a palm vein GUI, according to the embodiment.

Next, the data structure of a display image DIB will be described with reference to FIGS. 9 and 10. FIG. 9 illustrates an example of the data structure of the display image DIB according to the present embodiment. FIG. 10 illustrates an example of an RGB gradation graph of a color palette dedicated for a palm vein GUI according to the present embodiment.

The display image data has the data structure 300 of the 8-bit (256-color) uncompressed DIB. More specifically, the display image data has a data structure as illustrated by a display image DIB 302. The display image DIB 302 has the color palette dedicated for the palm vein GUI.

The color palette dedicated for the palm vein GUI is a color palette comprising a background palette having the indexed colors from the indexed color [0] to the indexed color [35] for designating the background color, and a palm palette in which the indexed colors from the indexed color [36] for designating a specific light color to the indexed color [255] for designating a specific dark color are arranged in the order of density.

Assuming that m is an integer from 0 to 35, to represent a background, the background palette of the color palette dedicated for the palm vein GUI can be represented by an indexed color [m]=(175, 110, 100, 0). More specifically, the background palette is represented by the indexed color [0]=(175, 110, 100, 0), the indexed color [1]=(175, 110, 100, 0), . . . , the indexed color [34]=(175, 110, 100, 0), as illustrated by an RGB gradation graph 312 of the color palette dedicated for the palm vein GUI.

Assuming that n is an integer from 36 to 255, to represent the palm, the palm palette of the color palette dedicated for the palm vein GUI can be represented by an indexed color [n]= (f1(n), f2(n), f3(n), 0). Here, the f1(n), the f2(n), and the f3(n) are functions of n determined in advance, such as f1(n)=210−int((n−35)/2)−mod(n−35, 2), f2(n)=250−int((n−35)/2)−mod (n−35, 2), f3(n)=255, provided that the function int(x) is the largest integer not larger than x, and the function mod (x, y) is a remainder of the quotient of x divided by y. More specifically, the background palette is represented by the indexed color [36]=(209, 249, 255, 0), the indexed color [37]=(209, 249, 255, 0), the indexed color [38]=(208, 248, 255, 0), . . . , the indexed color [255]=(100, 140, 255, 0), as illustrated by the RGB gradation graph 312 of the color palette dedicated for the palm vein GUI.

The pixel data stores the array element index numbers of the indexed colors of all the pixels on a pixel-by-pixel basis according to the photographed image. Note that the pixel data of the display image data is the same as the pixel data of the photographed image data.

As described hereinabove, the photographed image data and the display image data have the data structure 300 of the 8-bit (256-color) uncompressed DIB, and the pixel data thereof are the same. The photographed image data and the display image data use different palettes, thereby making it possible to display different images. At this time, the processing device 11 does not perform any processing on the pixel data, so that it is possible to perform high-speed image conversion.

Figure 11:
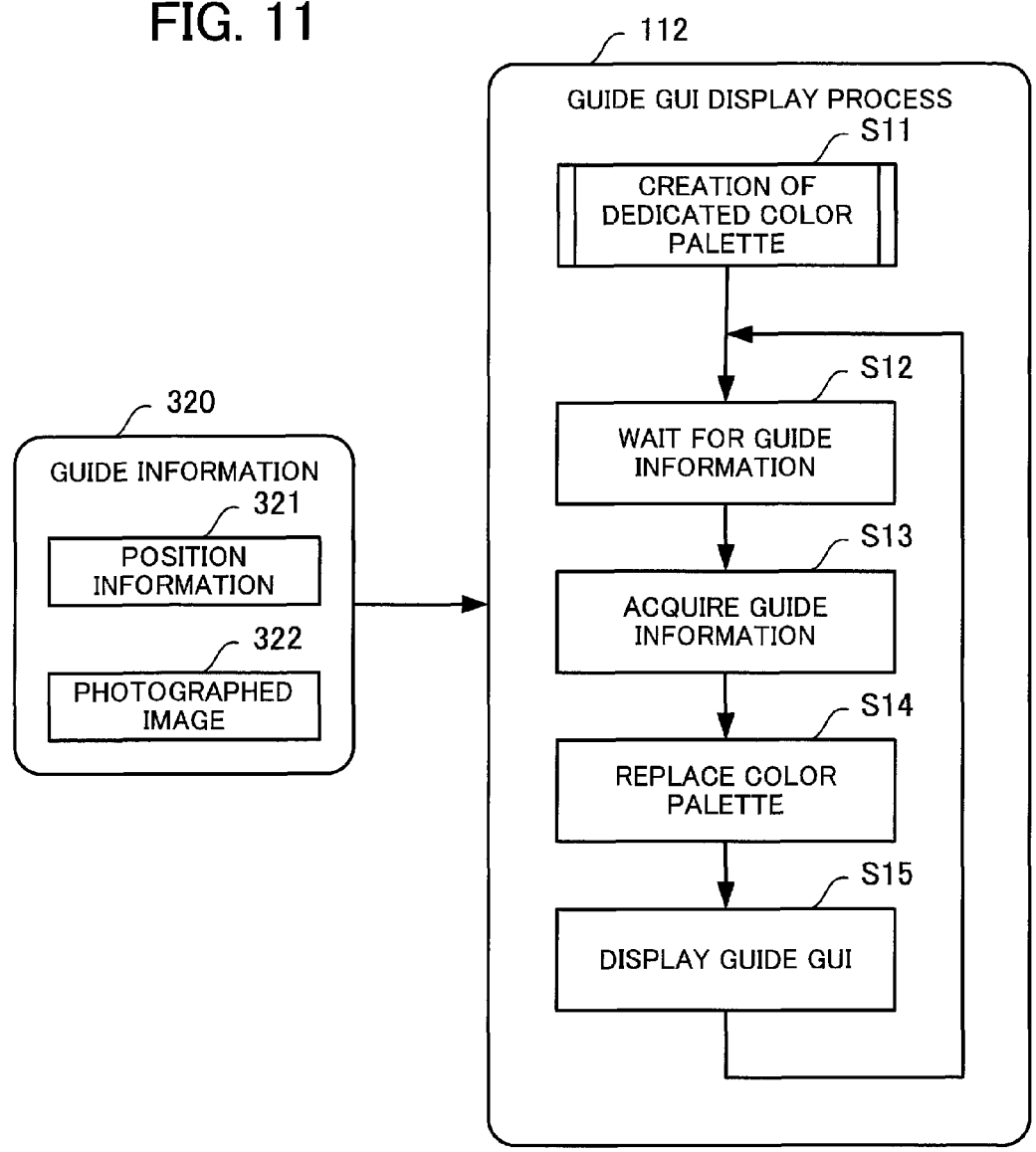
FIG. 11 illustrates a processing flow of a guide GUI display process according to the embodiment.

Next, the guide GUI display process 112 executed by the processing device 11 will be described in detail with reference to FIG. 11. FIG. 11 illustrates a processing flow of the guide GUI display process according to the present embodiment.

The guide GUI display process 112 is for displaying the guide GUI for guiding a palm to an appropriate position, on the display 12, based on the photographed image acquired from photographed image-acquiring process 111.

Further, the guide GUI display process 112 is for acquiring guide information 320 from the imaging state-determining process 114. The guide information 320 includes position information 321 and a photographed image 322.

[Step S11] The processing device 11 executes a dedicated color palette-creating process for creating a dedicated color palette (color palette dedicated for a palm vein GUI) as an initialization process, to thereby create the color palette dedicated for the palm vein GUI. The dedicated color palette-creating process will be described hereinafter in detail with reference to FIG. 12.

[Step S12] The processing device 11 waits for the guide information 320 to be acquired.

[Step S13] The processing device 11 acquires the guide information 320. Now, the acquired photographed image 322 has the data structure of the source image DIB 301, and has the 256-level gradation grayscale palette set therefor.

[Step S14] The processing device 11 replaces the 256-level gradation grayscale palette set for the photographed image 322 with the color palette dedicated for the palm vein GUI.

[Step S15] The processing device 11 displays the guide GUI for guiding the palm to the appropriate position, based on a display image formed by setting the color palette dedicated for the palm vein GUI, for the photographed image acquired from photographed image-acquiring process 111, and then proceeds to the step S12.

Figure 12:
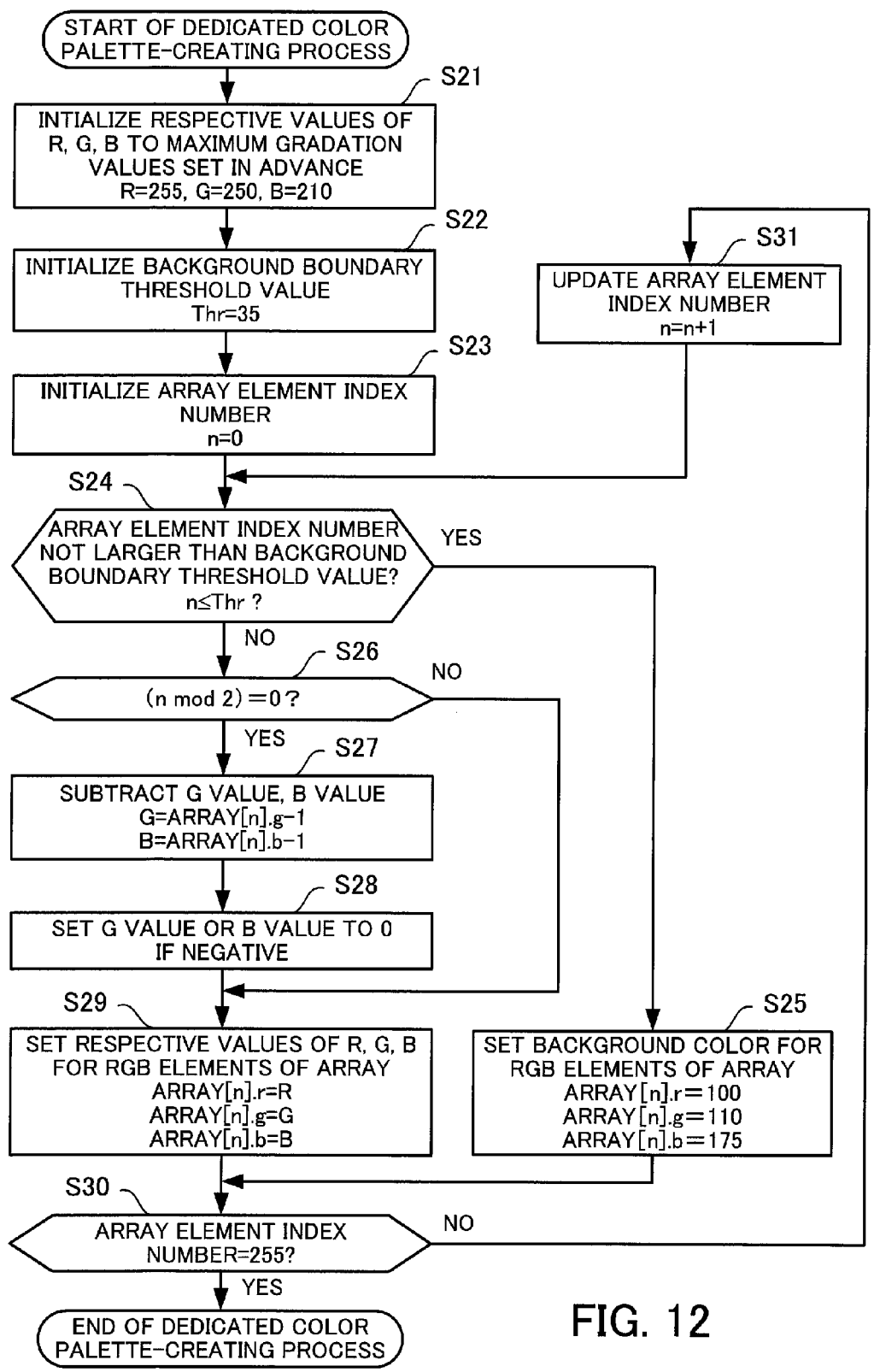
FIG. 12 is a flowchart of a process for creating the dedicated color palette, according to the embodiment.

Next, the dedicated color palette-creating process executed by the processing device 11 will be described with reference to FIG. 12. FIG. 12 is a flowchart of the dedicated color palette-creating process according to the present embodiment.

The dedicated color palette-creating process is a process for creating the color palette dedicated for the palm vein GUI.

Note that although the creation of the color palette dedicated for the palm vein GUI is performed only once at the start-up of the authentication apparatus 10, it may be performed whenever authentication is carried out.

[Step S21] The processing device 11 initializes the values of the elements "B", "G" and "R" of the indexed colors of the color palette. The elements "B", "G" and "R" are initialized to the largest gradation values set in advance. For example, the processing device 11 sets the element "B"="210", the element "G"="250", and the element "R"="255", as initial values. This color is the light orange color, and is considered not to cause a feeling of strong wrongness. However, the color sometimes causes a feeling of wrongness depending on countries or regions, and therefore the initial values may be set as desired according to environments or tastes of individuals.

[Step S22] The processing device 11 initializes the background boundary threshold value. Note that the initial value of the background boundary threshold value may be set in advance or an appropriate value dependent on photographing environments may be set as the initial value of the background boundary threshold value e.g. by searching for a value that will make it possible to favorably reproduce the contour of the hand. For example, the processing device 11 sets the background boundary threshold value "Thr"="35" as the initial value.

[Step S23] The processing device 11 initializes the array element index number of the indexed color of the color palette, by setting "n"="0".

[Step S24] The processing device 11 determines whether or not the array element index number is not larger than the background boundary threshold value. If the array element index number is not larger than the background boundary threshold value, the processing device 11 proceeds to a step S25, whereas if the array element index number is larger than the background boundary threshold value, the processing device 11 proceeds to a step S26.

[Step S25] The processing device 11 set the respective elements "B", "G" and "R" of the indexed colors of the array element index number [n] to values for the background color. For example, the processing device 11 sets the element "B" to "175", the element "G" to "110", and the element "R" to "100". The complementary color of the light orange color is selected as the background color, which makes clear the boundary between the background color and the light orange color adjacent to the background color, thereby enhancing the visibility of the contour of the palm.

The processing device 11 determines in a step S30 whether or not the array element index number has reached the upper limit value "255". If the array element index number has not reached the upper limit value "255", the processing device 11 proceeds to a step S31, to increment the array element index number by "1" for updating the same, and proceeds to the step S24.

As described above, the processing device 11 sets each element of the indexed colors of the array element index numbers "0" to "35" to the background color.

[Step S26] The processing device 11 determines whether or not a remainder of the quotient of the array element index number "n" divided by "2" is equal to "0". In other words, the processing device 11 determines whether or not the array element index number "n" is divided by 2 without a remainder. If the remainder acquired by dividing the array element index number "n" by "2" is equal to "0", the processing device 11 proceeds to a step S27, whereas if the remainder acquired by dividing the array element index number "n" by "2" is not equal to "0", the processing device 11 proceeds to a step S29.

With this, the update of the values of the elements "B", "G" and "R" of the indexed colors in the step S27, referred to hereinafter, is executed every two times of execution of the loop, whereby the processing device 11 reduces the range of gradation of colors used for displaying the palm. By reducing the range of gradation of the colors used for displaying the palm, it is possible to prevent a vein image in a display image of the palm from becoming conspicuous. Note that a number by which the array element index number "n" is divided can be set, as desired. As the number by which the array element index number "n" is divided is set to a larger value, it is possible to reduce the range of gradation of the colors used for displaying the palm, and the vein image can be made more inconspicuous as the range of gradation is made smaller.

[Step S27] The processing device 11 calculates values to which the respective elements "B", "G" and "R" of the indexed colors are to be set, based on the indexed color [n]=(f1(n), f2(n), f3(n), 0). For example, in a case where f1(n)=210−int((n−35)/2)−mod(n−35, 2), f2(n)=250−int((n−35)/2)−mod(n−35, 2), f3(n)=255, the processing device 11 calculates the values to which the elements "B", "G" are to be set, by decrementing current values thereof by "1", while the value to which the element "R" is to be set is calculated as a fixed value.

[Step S28] The processing device 11 corrects the values to which the respective elements "B", "G" and "R" of the indexed colors are to be set, such that they become values not smaller than 0 and not larger than 255. For example, the processing device 11 corrects a calculated value decremented to a negative value, to "0".

[Step S29] The processing device 11 sets the elements "B", "G" and "R" of the indexed colors of the array element index number [n] to the values calculated in the steps S27 and S28. The processing device 11 determines in the step S30 whether or not the array element index number has reached the upper limit value "255". If the array element index number has not reached the upper limit value "255", the processing device 11 proceeds to the step S31, to increment the array element index number by "1" for updating the same, and proceeds to the step S24.

As described above, the processing device 11 sets the respective elements of the indexed colors of the array element index numbers "36" to "255" to colors used for displaying the palm. If the array element index number has reached the upper limit value "255", the processing device 11 terminates the dedicated color palette-creating process.

Note that the dedicated color palette-creating process can be executed in desired timing, e.g. at the start-up of the authentication apparatus 10 or during authentication. For example, the dedicated color palette-creating process may be executed at the start-up of the authentication apparatus 10 such that all the users use the same color palette dedicated for the palm vein GUI. Further, the dedicated color palette-creating process may be executed during authentication of users such that a different color palette dedicated for the palm vein GUI is used on a user basis.

The color palettes dedicated for palm vein GUIs, used on a user basis, are created by generating color palettes with different color arrays by using as parameters e.g. user-specific information, such as the skin colors, blood circulations, genders, or ages of users, or alternatively external environments (time, weathers, regions, ambient brightness). This makes it possible for the dedicated color palette-creating process to generate optimum palettes according to conditions at the time of authentication of the users.

Figure 13A:
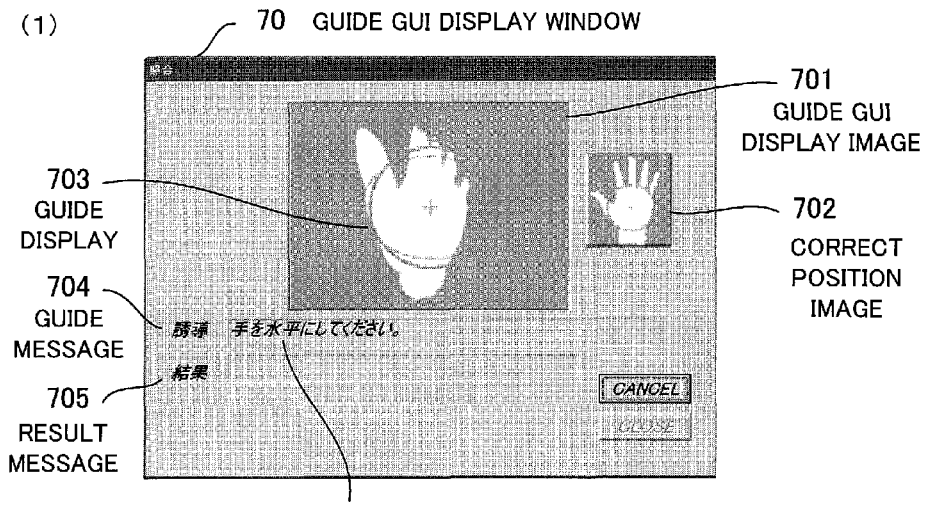
FIGS. 13A and 13B illustrate examples (1) and (2) of display on a guide GUI display window according to the embodiment.
Figure 13B:
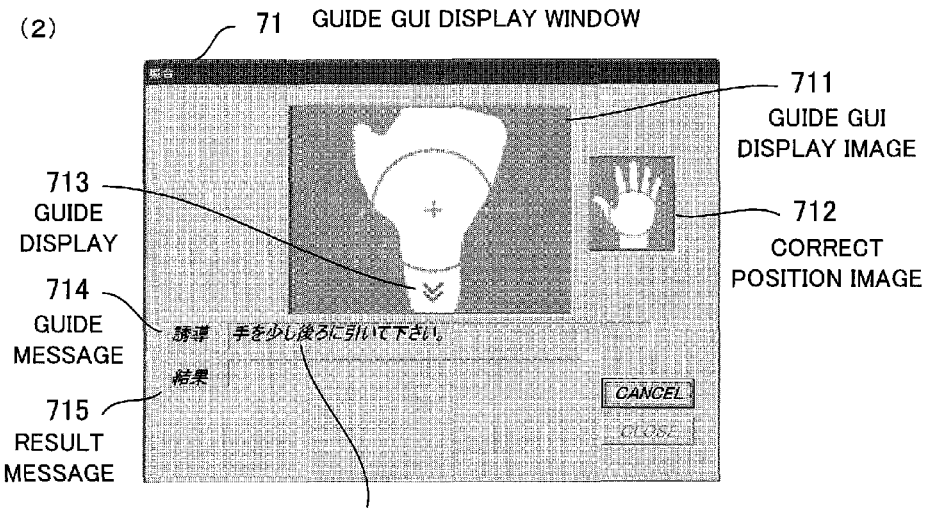
Figure 14A:
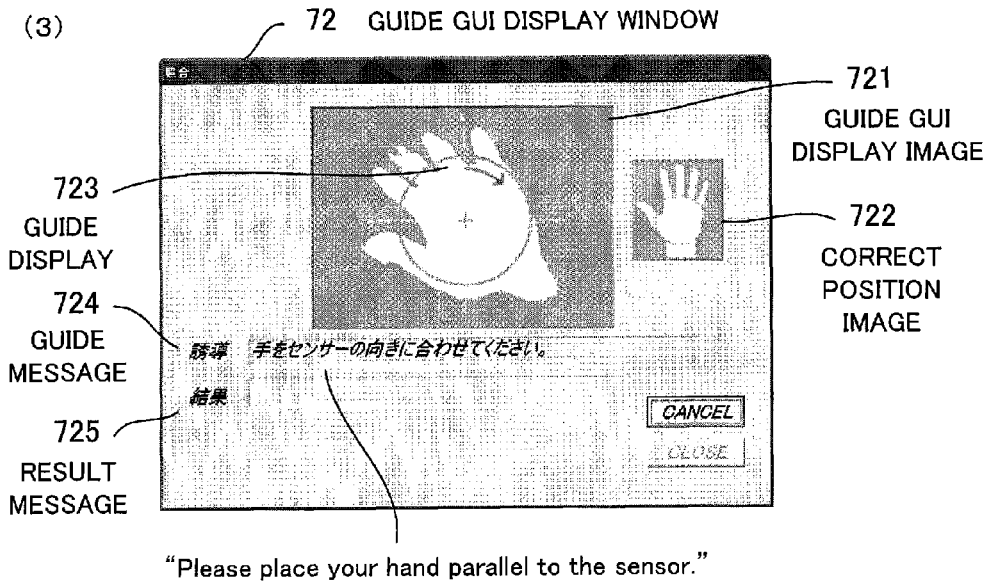
FIGS. 14A and 14B illustrate examples (3) and (4) of display on a guide GUI display window according to the embodiment.
Figure 14B:
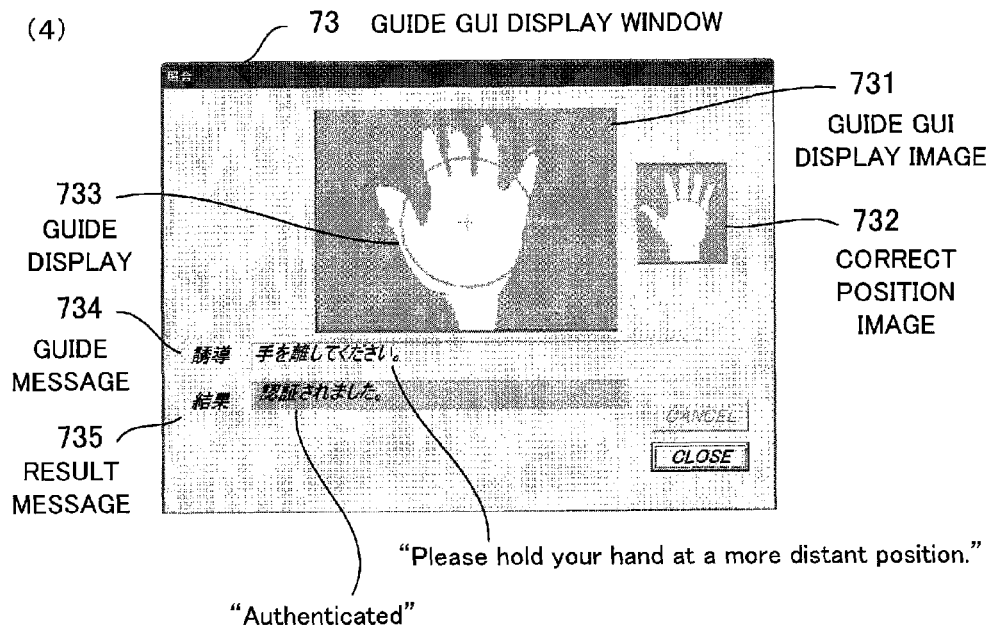
Figure 15:
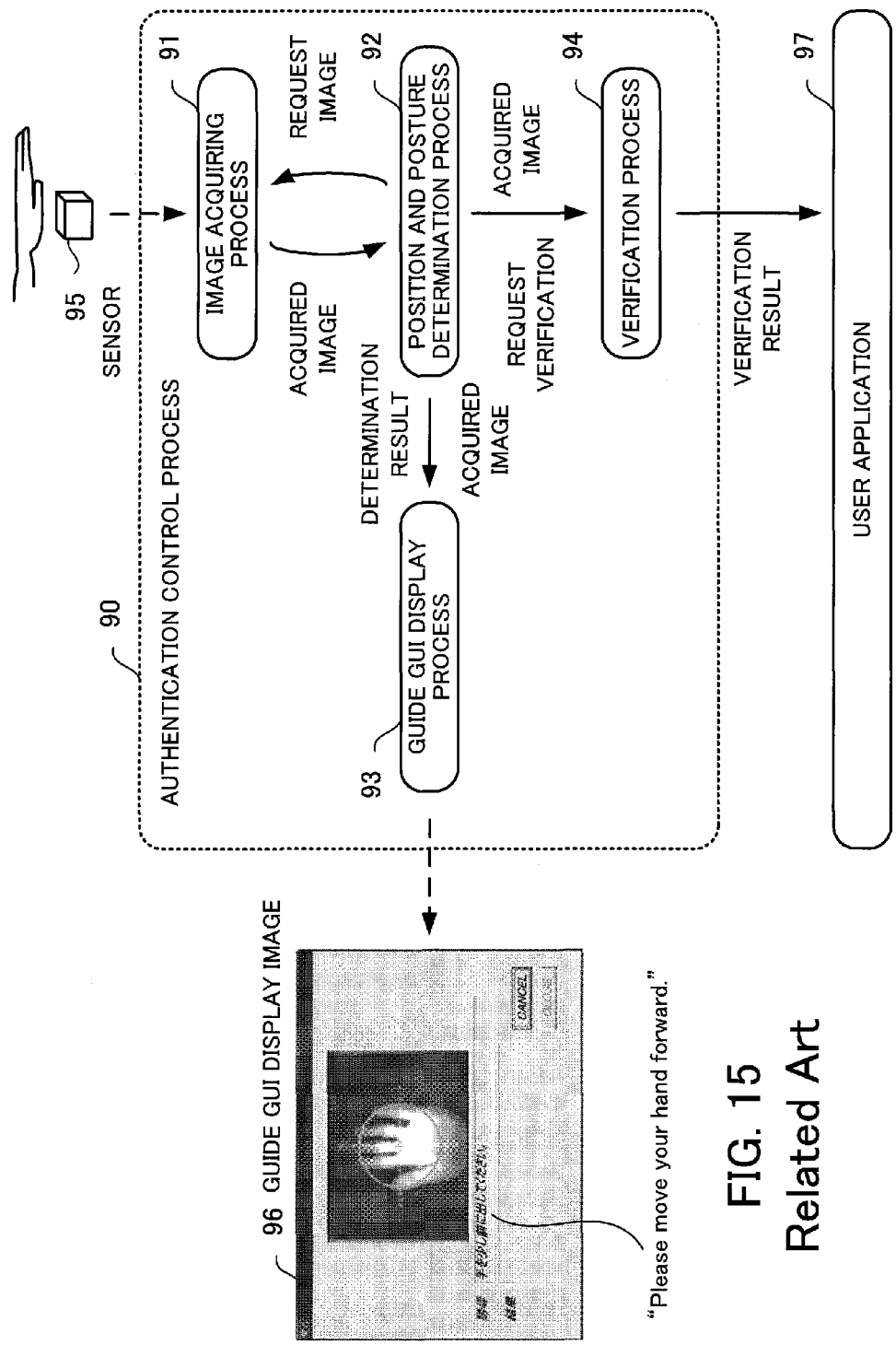
FIG. 15 illustrates a conventional authentication control process.

Next, examples of displays on a guide GUI display window which is displayed by the authentication apparatus 10 on the display 12 will be described with reference to FIGS. 13A, 13B, 14A and 14B. FIGS. 13A and 13B illustrate examples (1) and (2) of the display on a guide GUI display window according to the present embodiment. FIGS. 14A and 14B illustrate examples (3) and (4) of the display on a guide GUI display window according to the present embodiment.

A guide GUI display window 70 is the example (1) of the guide GUI display window which is displayed by the authentication apparatus 10 on the display 12. The guide GUI display window 70 includes a guide GUI display image 701, a correct position image 702, a guide display 703, a guide message 704, and a result message 705, in the window.

The guide GUI display image 701 is an image displayed by replacing a photographed image palette for a photographed image with a display image palette. The guide GUI display image 701 displays a background, a palm image, and the guide display 703 indicating a correct position of the palm. The guide display 703 displays a true circle indicating the correct position of the palm, and an ellipse indicating that the palm of the user is inclined, for example. The correct position image 702 is displayed for guiding the palm of the user to the correct position.

The guide message 704 is displayed for guiding the palm of the user to the correct position. For example, the guide message 704 displays a message of "Please hold your hand level." for notifying the user that the palm of the user is inclined. The result message 705 is displayed for notifying the user of the result of user verification by the authentication apparatus 10. For example, in the case where the palm of the user is inclined, no message is displayed as the result message 705 since it is impossible to perform authentication.

A guide GUI display window 71 is the example (2) of the guide GUI display window which is displayed by the authentication apparatus 10 on the display 12. The guide GUI display window 71 includes a guide GUI display image 711, a correct position image 712, a guide display 713, a guide message 714, and a result message 715, in the window.

The guide GUI display image 711 is an image displayed by replacing the photographed image palette for a photographed image with the display image palette. The guide GUI display image 711 displays a background, a palm image, and the guide display 713 indicating a correct position of the palm. The guide display 713 displays a true circle indicating the correct position of the palm, and an arrow indicating that the palm of the user is displaced from the center position, for example. The correct position image 712 is displayed for guiding the palm of the user to the correct position. Note that an image registered as the palm of the user may be used for the correct position image 712. Alternatively, the correct position image 712 is displayed by replacing the photographed image palette with display image palette, in displaying the display for guiding the palm of the user to the correct position or in displaying the image registered as the palm of the user.

The guide message 714 is displayed for guiding the palm of the user to the correct position. For example, the guide message 714 displays a message of "Please slightly draw back your hand." for notifying the user that the palm of the user is displaced from the center position. The result message 715 is displayed for notifying the user of the result of user verification by the authentication apparatus 10. For example, in the case where the palm of the user is displaced from the center position, no message is displayed as the result message 715 since it is impossible to perform authentication.

A guide GUI display window 72 is the example (3) of the guide GUI display window which is displayed by the authentication apparatus 10 on the display 12. The guide GUI display window 72 includes a guide GUI display image 721, a correct position image 722, a guide display 723, a guide message 724, and a result message 725, in the window.

The guide GUI display image 721 is an image displayed by replacing the photographed image palette for a photographed image with the display image palette. The guide GUI display image 721 displays a background, a palm image, and the guide display 723 indicating a correct position of the palm. The guide display 723 displays a true circle indicating the correct position of the palm, and an arrow indicating that the palm of the user is displaced counterclockwise, for example. The correct position image 722 is displayed for guiding the palm of the user to the correct position.

The guide message 724 is displayed for guiding the palm of the user to the correct position. For example, the guide message 724 displays a message of "Please place your hand parallel to the sensor." for notifying the user that the palm of the user is displaced counterclockwise. The result message 725 is displayed for notifying the user of the result of user verification by the authentication apparatus 10. For example, in the case where the palm of the user is displaced counterclockwise, no message is displayed as the result message 725 since it is impossible to perform authentication.

A guide GUI display window 73 is the example (4) of the guide GUI display window which is displayed by the authentication apparatus 10 on the display 12. The guide GUI display window 73 includes a guide GUI display image 731, a correct position image 732, a guide display 733, a guide message 734, and a result message 735, in the window.

The guide GUI display image 731 is an image displayed by replacing the photographed image palette for a photographed image with the display image palette. The guide GUI display image 731 displays a background, a palm image, and the guide display 733 indicating a correct position of the palm. The guide display 733 displays only a true circle indicating the correct position of the palm of the user, for example, since the inclination of the palm and the position thereof in front-rear and left-right directions are correct though the palm is closer to the sensor unit 20 than the correct position. The correct position image 732 is displayed for guiding the palm of the user to the correct position.

The guide message 734 is displayed for guiding the palm of the user to the correct position. For example, the guide message 734 displays a message of "Please hold your hand at a more distant position" for notifying the user that the palm of the user is closer to the sensor unit 20 than the correct position. The result message 735 is displayed for notifying the user of the result of user verification by the authentication apparatus 10. For example, as the result message 735, there is displayed "Authenticated" as a result of successful verification by the authentication apparatus 10.

Note that the processing functions of the above-described embodiments can be realized by a computer. In this case, there is provided a program describing the details of processing of the functions which the authentication apparatus 10 and the database server 40 are to have. By executing the program by the computer, the processing functions described above are realized on the computer. The program describing the details of processing can be recorded in a computer-readable storage medium (including a portable recording medium). Examples of the computer-readable recording medium include a magnetic recording device, an optical disk, a magneto-optical recording medium, and a semiconductor memory. Examples of the magnetic recording device include a hard disk drive (HDD), a flexible disk (FD), and a magnetic tape. Examples of the optical disk include a DVD (digital versatile disk), a DVD-RAM, a CD-ROM, a CD-R (recordable)/RW (rewritable). Examples of the magneto-optical recording medium include an MO (magneto-optical disc).

In case of distributing programs, for example, portable recording mediums, such as DVD, CD-ROM or the like in which the program is recorded are marketed. Further, it is also possible to store the program in a storage device of a server computer, and transfer the program from the server computer to the other computer via a network.

The computer which carries out the program stores, for example, the program which is recorded in the portable recording medium, or is transferred from the server computer in the storage device thereof. Then, the computer reads out the program from the storage device thereof, and carries out the processes according to the program. Note that the computer is also capable of directly reading out the program from the portable recording medium, and carrying out the processes according to the program. Further, the computer is also capable of carrying out the processes according to the program which is received, each time the program is transferred from the server computer.

According to the above-described authentication apparatus, authentication program, and authentication method, it is possible to display a guide display screen that is excellent in visibility and is reduced in the risk of occurrence of privacy or security problems, without an increase in processing load.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable medium storing a computer program for authenticating an individual by using a biometric feature of a living body, the computer program causing a computer to perform a procedure comprising:
   generating, from an photographed image of the living body, photographed image data including a monochromatic palette formed by arranging indexed colors to which monochromatic colors are assigned in order of density;
   generating display data by replacing the monochromatic palette included in the photographed image data with a color palette in which one of arrangements formed by dividing the arrangement of the indexed colors by a predetermined background boundary threshold value is set as a background display arrangement of indexed colors to which a background color is assigned, and the other of the arrangements is set as a living body display arrangement of indexed colors to which a specific color is assigned in order of density; and
   displaying the living body using the display data,
   wherein the order of density of the indexed colors arranged in the monochromatic palette, and the order of density of the indexed colors arranged in the living body display arrangement are opposite in direction to each other; and
   wherein a range of density of the indexed colors arranged in the living body display arrangement is smaller than a range of density of the indexed colors arranged in the monochromatic palette.

2. The storage medium according to claim 1, wherein one of the indexed colors arranged in the background display arrangement, adjacent to the living body display arrangement, and one of the indexed colors arranged in the living body display arrangement, adjacent to the background display arrangement, have a complementary color relationship with each other.

3. The storage medium according to claim 2, wherein the background color is a monochromatic color.

4. The storage medium according to claim 1, wherein the monochromatic palette is a grayscale palette.

5. The storage medium according to claim 1, wherein the order of density of the indexed colors arranged in the living body display arrangement is opposite to an order of density of the indexed colors to which the specific color is assigned.

6. An information processing apparatus that authenticates an individual by using a biometric feature of a living body, the information processing apparatus comprising one or more processors configured to perform a procedure including:
   generating, from an photographed image of the living body, photographed image data including a monochromatic palette formed by arranging indexed colors to which monochromatic colors are assigned in order of density;
   generating display data by replacing the monochromatic palette included in the photographed image data with a color palette in which one of arrangements formed by dividing the arrangement of the indexed colors by a predetermined background boundary threshold value is set as a background display arrangement of indexed colors to which a background color is assigned, and the other of the arrangements is set as a living body display arrangement of indexed colors to which a specific color is assigned in order of density; and
   displaying the living body using the display data,
   wherein the order of density of the indexed colors arranged in the monochromatic palette, and the order of density of the indexed colors arranged in the living body display arrangement are opposite in direction to each other; and
   wherein a range of density of the indexed colors arranged in the living body display arrangement is smaller than a range of density of the indexed colors arranged in the monochromatic palette.

7. An authentication method executed by a computer for authenticating an individual by using a biometric feature of a living body, the authentication method comprising:
   generating, from an photographed image of the living body, photographed image data including a monochromatic palette formed by arranging indexed colors to which monochromatic colors are assigned in order of density;
   generating display data by replacing the monochromatic palette included in the photographed image data with a color palette in which one of arrangements formed by dividing the arrangement of the indexed colors by a predetermined background boundary threshold value is set as a background display arrangement of indexed colors to which a background color is assigned, and the other of the arrangements is set as a living body display arrangement of indexed colors to which a specific color is assigned in order of density; and
   displaying the living body using the display data,
   wherein the order of density of the indexed colors arranged in the monochromatic palette, and the order of density of the indexed colors arranged in the living body display arrangement are opposite in direction to each other; and
   wherein a range of density of the indexed colors arranged in the living body display arrangement is smaller than a range of density of the indexed colors arranged in the monochromatic palette.

* * * * *